US011985177B1

(12) United States Patent
Moore et al.

(10) Patent No.: US 11,985,177 B1
(45) Date of Patent: May 14, 2024

(54) CENTRALIZED VIEW FOR MEDIA DEVICE CONNECTIVITY COMBINING VARIOUS MEDIA REGISTRIES TO SHOW RELEVANT NETWORK STATISTICS

(71) Applicant: Arista Networks, Inc., Santa Clara, CA (US)

(72) Inventors: Hampton Reed Moore, Shrewsbury, MA (US); Sakti Aishwarya Arunachalam, Union City, CA (US); Gerard Neale Phillips, Winchester (GB); David Andrew Murray, London (GB)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 18/191,753

(22) Filed: Mar. 28, 2023

(51) Int. Cl.
 *H04L 12/26* (2006.01)
 *H04L 12/18* (2006.01)
 *H04L 12/761* (2013.01)
 *H04L 61/4511* (2022.01)
 *H04L 65/60* (2022.01)

(52) U.S. Cl.
 CPC .......... *H04L 65/60* (2013.01); *H04L 61/4511* (2022.05)

(58) Field of Classification Search
 CPC ..... H04L 65/60; H04L 61/4511; H04L 12/26; H04L 12/18

USPC ........................................................ 709/245
 See application file for complete search history.

(56) References Cited

U.S. PATENT DOCUMENTS

| | | | |
|---|---|---|---|
| 6,615,408 B1* | 9/2003 | Kaiser | G06Q 30/02 725/112 |
| 2011/0095079 A1* | 4/2011 | Tse | H04N 1/00973 358/1.15 |
| 2011/0315758 A1* | 12/2011 | Shuman | G03G 15/5079 235/375 |
| 2014/0061290 A1* | 3/2014 | Bradford | G06Q 30/0185 235/487 |
| 2018/0183697 A1* | 6/2018 | Dhesikan | H04L 45/48 |

* cited by examiner

*Primary Examiner* — Jude Jean Gilles
(74) *Attorney, Agent, or Firm* — Sprinkle IP Law Group

(57) ABSTRACT

Systems, methods and products for providing a centralized view of media production devices connected to a network. An example method includes identifying a set of media production devices connected to a network and compiling a list of the identified devices. Network position information is then collected for the identified devices using resources including IS-04 device registries, LLDP tables, FDB tables and ARP tables. For each of the identified devices, a corresponding connection to the network is identified and corresponding network statistics are collected for each of the identified connections of the devices to the network, where the network statistics are correlated to the identified devices. A list of the identified devices is then stored in a searchable format with the corresponding network statistics, and particular ones of the devices may be highlighted to denote conditions indicated by the corresponding network statistics.

20 Claims, 5 Drawing Sheets

CENTRALIZED VIEW FOR MEDIA DEVICE CONNECTIVITY COMBINING VARIOUS MEDIA REGISTRIES TO SHOW RELEVANT NETWORK STATISTICS

TECHNICAL FIELD

The disclosure relates generally to monitoring connectivity of media devices, and more particularly to systems and methods for retrieving information from multiple sources to identify all media devices connected to an IP network, identifying relevant connection statistics and presenting the connection information with the associated media devices to enable identification of particular connectivity issues corresponding to the media devices.

BACKGROUND

Media production may involve many different devices, such as cameras, microphones, monitors, speakers, etc. These media production devices may be interconnected by networks so that they can each be accessed and so that they can be interoperable. For instance, devices of different vendors may have to interact with the same switches and the same control components. The networks connecting the media production devices may be large, and there may be various problems relating to the use of these networks which need to be monitored so that they do not interfere with the interaction of the media production devices.

In order to be able to interact with the media production devices, it is necessary to get some information about the media devices on the network. Existing systems use open specifications such as the Networked Media Open Specifications (NMOS), which has APIs to expose registries that contain configuration information about the devices. The registries, however, do not provide a way to monitor or validate the activities of the devices. Obtaining this type of information in existing systems requires significant analysis of multiple components.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
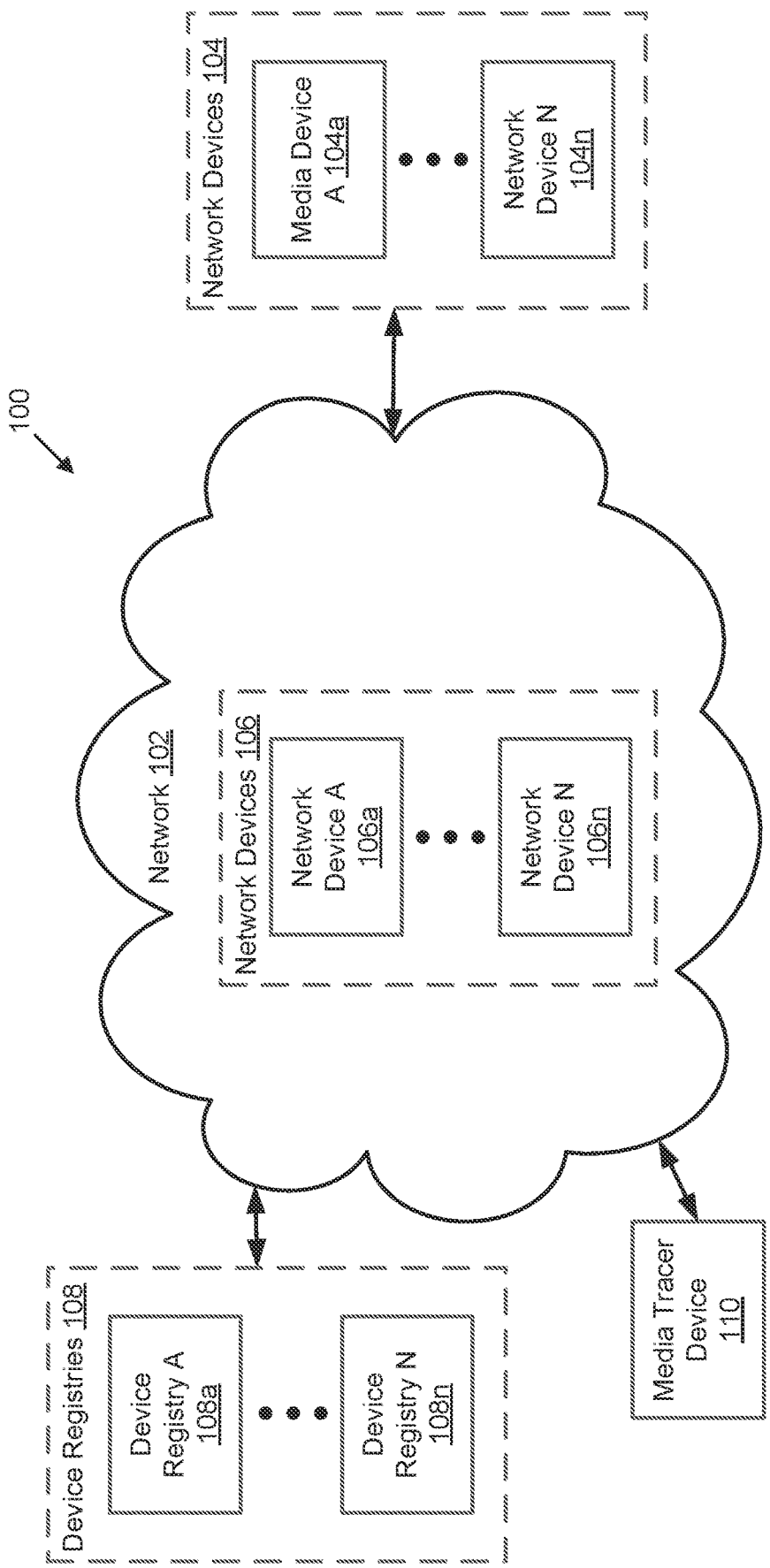
FIG. 1 is a block diagram illustrating an example media production system having a plurality of media production devices connected to a network in accordance with some embodiments.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Existing systems rely on media Registration and Discovery Systems (RDS) for just managing and viewing information related to the media devices. These registries offer no integration with the network infrastructure and therefore offer no visibility into the IP network. The devices disclosed herein (which may be referred to as media tracer devices) extend the abilities of registries by integrating with network topology through APIs to create digestible monitoring and observability information for the end user.

Embodiments disclosed herein use multiple sources of information for the media production devices that have been identified in a network and correlate this information so that a user can see not only the device configuration information that is available for the devices, but also network information that is associated with each of the devices. The user can then identify issues such as unusual amounts of network traffic that are being handled by a device, network errors that are caused by a particular device, and so on.

In some embodiments, a media tracer device initially uses a discovery daemon to compile a list of the media devices that are connected to the network. The media tracer then collects data from the network switches via APIs that expose Link Layer Discovery Protocol (LLDP), Address Resolution Protocol (ARP) and forwarding database (FDB) data. Using this information, the media tracer determines where each media device is connected to the network.

After this has been determined, the media tracer collects information from the network devices that is relevant to the connections corresponding to the media devices, such as the amount of traffic associated with the connection, errors that are associated with the connection, etc. This information is then stored in a searchable format so that it can be used by an administrator or other user.

In some cases, the information may be displayed by an interface that highlights certain ones of the media devices or other pieces of information that may be of interest. For example, the interface may highlight devices which are contained in the device registry but are not in the network, interface ports that are operating near capacity, or devices that have irregular ingress and/or egress traffic.

Embodiments disclosed herein can therefore make it easy for a user to monitor the connectivity of the media production devices in a network and to have a view of how the devices are connected to the network. These embodiments can also allow the user to identify problems such as the overloading of data links, irregular data traffic to or from devices, devices at particular positions in the network causing errors, misnumbering of devices, devices being in the wrong networks, and various other events or conditions.

Before describing the present embodiments in detail, it may be helpful to describe the context of existing systems. In the field of media production, as in the field of broadcasting, there are many different vendors, and each of these vendors has their own devices. These media devices are interconnected by infrastructures that are shifting from Serial Digital Interface (SDI) infrastructures to Internet Protocol (IP) based infrastructures.

Once media production started shifting from traditional SDIs to IP infrastructures there was a need to promote interoperability between different vendors. For example, if a device of Vendor 1 has to work with a device of Vendor 2, both of the devices should be able to interact with the same switches and with a central control component.

In order to promote this interoperability, open specifications were developed using Networked Media Open Specifications (NMOS). NMOS provides Application Programming Interfaces (APIs) and a registry model where all of the connected devices expose information related to the types of the devices, metadata about the data flows from the devices, the multicast senders and receivers to which they are related, etc. NMOS exposes this information in a standardized format, similar to the way information is exposed by OpenConfig within the context of networking systems. The information about the media devices is entered into the registries, and there are broadcast controllers which orchestrate the connections between the endpoint media devices. The broadcast controllers normally retrieve information from the registries and therefore understand what the devices need. The broadcast controllers can then push the device configuration information onto the network.

There are a number of problems that were created when the shift from older, SDI based infrastructures to newer, IP based infrastructures occurred. One of the problems arising from the shift and the necessity for a standard space related to the monitoring of devices. Monitoring in older SDI infrastructures was difficult, particularly when the only available means to perform monitoring were patch panel interfaces. Users would have to plug a cable into the interface and view a signal on a monitor to validate some aspect of the device communications. In the case of IP networks, since all communications are packet based, there was no straightforward way to validate the information. It was instead necessary to analyze multiple network components to determine exactly where an error might have arisen in the network and to provide useful information about the problem. This could be a very complex, tedious and time consuming process.

The present embodiments address these problems by correlating information from the registry using different data sources such as a Link Layer Discovery Protocol (LLDP), an Address Resolution Protocol (ARP), and a switch's Forwarding Database (FDB), and sending the results to a GUI of a platform for network workload orchestration and work flow automation. The GUI uses the information to correlate network statistics with data from the media devices and presents information based on the correlated data.

In some embodiments, a media tracer device uses multiple sources, including IS-04 Registries, LLDP, ARP, and FDB to create a list of all media devices on a network. The media tracer then finds the relevant network port and switch to which each device is connected. The media tracer then displays relevant connection statistics that allow a user to extrapolate discovery and connection information from the media registry onto the information discovered using various on the IP network. For example, the user can identify ports running near capacity, IP addresses of devices, devices that are reported in the registry but not the network, and create a topological view of which devices are connected to corresponding points in the network.

Referring to FIG. 1, an exemplary media production system 100 having a plurality of media devices 104 connected to a network 102 is illustrated. Media devices 104 may include a variety of different types of devices such as cameras, microphones, monitors, speakers, etc. Although media devices 104 are depicted collectively in the figure, each of the media devices may be individually connected to the network at a different location using a different physical connection to the network.

It should be noted that different instances of the same or similar devices may be identified herein by a common reference number followed by a letter. For instance, as depicted in FIG. 1, this system includes media devices 104a-104n. The individual media devices may be referred to collectively by the number alone (e.g., media devices 104).

Network 102 comprises a set of interconnected switches, communication links and various other network devices 106. Although network devices 106 are depicted collectively in the figure, each of the network devices may occupy a different position in the network and may be interconnected with one or more other media devices to form the network.

Network devices 106 may be connected to other network devices in any type of network topology, and may provide any number of operable connections between the various network devices. Network devices 106 cooperatively enable transmission of data traffic through the network. Network devices 106 may implement any number and/or type of communication protocols. The implemented protocols may enable network data traffic to be transmitted through the network to and from the various devices (e.g., media devices 104) which are connected to the network.

One or more device registries 108 are also coupled to network 102. Registries 108 may, for example, be IS-04 registries as specified by NMOS for device discovery and registration. Registries 108 include resources such as nodes, devices, senders, receivers, sources, flows, etc. The registries allow control and monitoring applications to find the resources which are available on the network. Each of media devices 104 which are connected to network 102 can locate registries 108 using, for example, DNS Service Discovery (DNS-SD) and register their resource information with the registries. Applications can then query the registries (e.g., using http and/or subscribing with websocket) to obtain information about the registered devices.

System 100 further includes a media tracer device 110 which is configured to implement a number of novel functions in which information about the connected media devices is obtained using resources that may include the device registries, LLDP tables, ARP tables and FDB tables. This device information is then correlated by media tracer 110 with network traffic and connectivity data to enable the display of network statistics associated with devices and the identification of devices that are associated with events of interest in the network. Media tracer 110 may also provide tools that utilize the correlated device and network information. For instance, media tracer 110 may provide a tool that applies a set of rules to the correlated information to identify media devices that meet criteria embodied in the rules and then highlight devices that meet these criteria in a display that is presented in a user interface.

Figure 2:
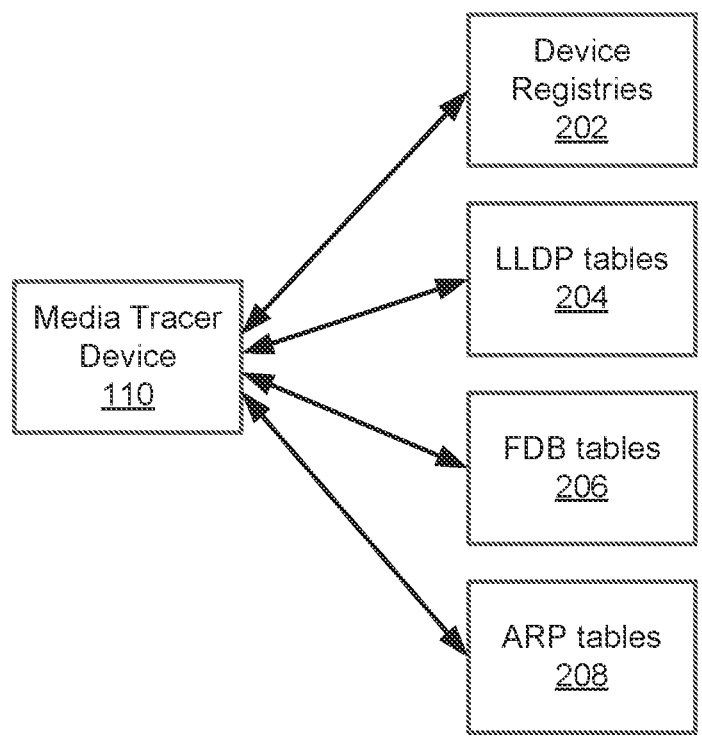
FIG. 2 is a block diagram illustrating the collection of relevant device information from various resources in accordance with some embodiments.

Referring to FIG. 2, a diagram is shown to illustrate the collection of relevant device information from various resources in accordance with some embodiments. As depicted in this figure, media tracer device 108 is coupled to obtain device information from four different resources: NMOS IS-04 registries 202, LLDP tables 204, FDB tables 206 and ARP tables 208.

NMOS IS-04 registry 202 stores information associated with the various resources connected to the network including, for example, the various media devices connected to the network, as well as other devices, nodes, senders, receivers, sources, flows, and the like. The registry is accessible by applications (e.g., control and monitoring applications) so that these applications can determine which resources are available on the network, and more particularly which media devices are connected to the network.

NMOS IS-04 registries 202 are present in existing media production networks, and the use of these registries to identify resources connected to a network is known. Media tracer device 110 accesses IS-04 registries 202 in the same manner as existing systems (e.g., using DNS-SD) and is able to obtain the same types of information from the registries that are obtained in existing systems.

The additional resources from which media tracer 110 obtains device information—LLDP tables 204, FDB tables 206 and ARP tables 208—are also existing sources of information, but these resources are not used in existing systems to identify the devices that are connected to the network. The use of these additional resources by media tracer device 110 allows the media tracer device to build a more complete view of the positioning and connectivity of the media devices in the network.

LLDP is a standard used in the data link layer (level 2 of the standard network architecture in the Open Systems Interconnection) OSI model. LLDP is used by network devices to identify other devices in the network and their capabilities. All supported interfaces send and receive LLDP packets from the networks to share information about the devices.

LLDP protocol describes the way a device identifies itself and publicizes its capabilities in the network by periodically transmitting packets of information about itself at periodic intervals. The collection of information (referred to as an LLDP data unit) contains information that includes mandatory information such as device identification information, port identification information and validity time of received information. The LLDP data unit may also include optional information such as port details (e.g., description), device name, software version, device function and capabilities and device IP and MAC address. The information of the LLDP data unit is stored in a management information database (MIB). There is typically an MIB at both the sender and receiver of a transmitted LLDP data unit. The information stored in the MIBs can be retrieved by the media tracer device using standard queries.

FBD tables are implemented in network switches for use in network bridging, routing, and similar functions. The tables are used to find the proper interface to which an input interface should send a packet for transmission. A layer 2 (L2) forwarding table contains Media Access Control (MAC) addresses. The purpose of the FDB tables is to allow the location of each host to be identified, so that when the switch thereafter receives a data packet specifying the host's MAC address as the destination MAC address, it searches the FDB for the MAC address and forwards the data packet to the appropriate destination host via the switch port specified in the same entry in the FDB.

ARP is the protocol that bridges L2 and L3 of the OSI model. This allows for the discovery of a device's MAC (media access control) address based on its known IP address. ARP messages include fields for hardware type, protocol type, hardware size, protocol size, OpCode, sender MAC address, sender IP address, target MAC address and target IP address. An ARP table stores the information discovered through ARP, and is used to record the discovered MAC and IP address pairs of devices connected to the network. Each device connected to the network has its own ARP table that stores the address pairs with which the device has communicated.

Figure 3:
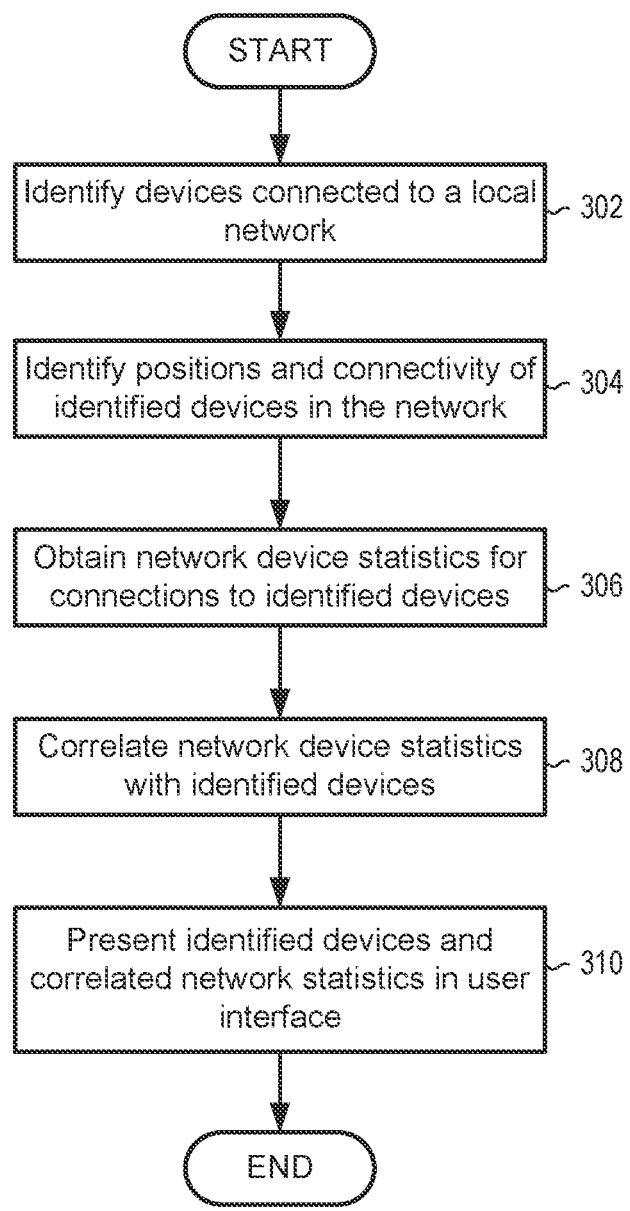
FIG. 3 is a flow diagram illustrating a method for providing a centralized view of information for media production devices in a network in accordance with some embodiments.

Referring to FIG. 3, a flow diagram illustrating a method for providing a centralized view of information for media production devices in a network is shown. In one embodiment, the method is performed by a media tracer device in the network to identify the media production devices that are connected to the network and to view information about the network connections associated with the media production devices.

At step 302, the devices connected to a network are identified. The identification of the connected devices is made using both resources that are conventionally used for this purpose (i.e., device registries) and resources that are not conventionally used, such as LDSS tables, ARP tables and FDB tables. The latter resources are used to augment the information from the device registries to provide a more accurate list of the connected devices.

Figure 4:
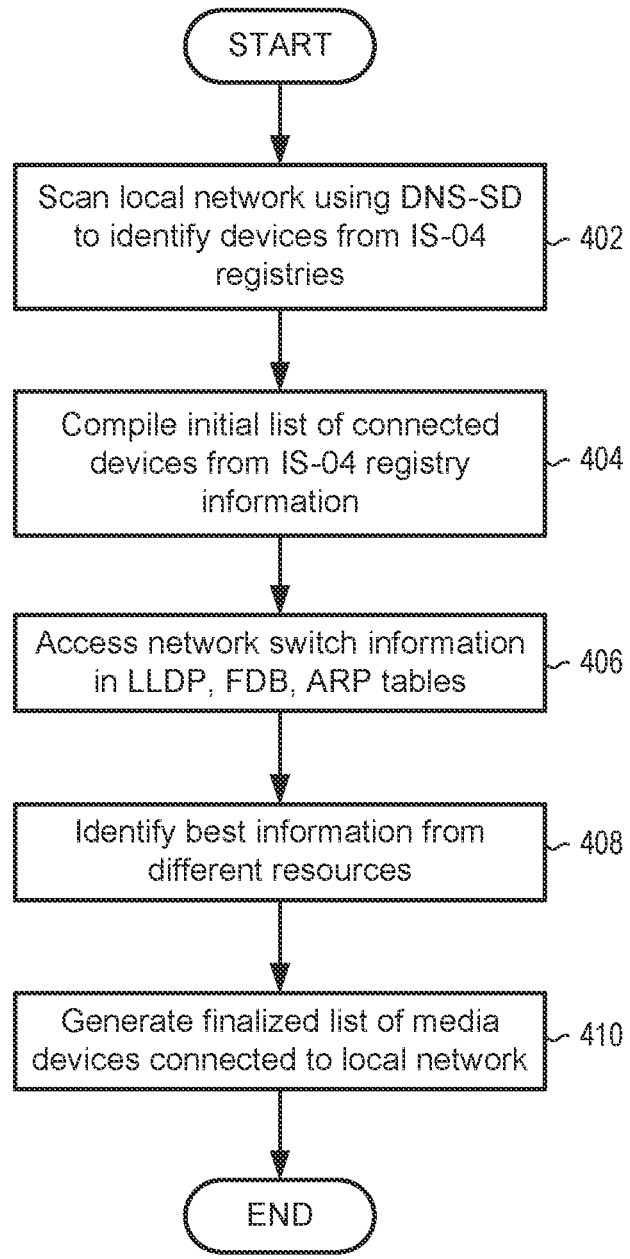
FIG. 4 is a flow diagram illustrating an example process by which devices are identified in accordance with some embodiments.

This portion of the method is shown in more detail in FIG. 4, which is a flow diagram illustrating an example process by which devices (e.g., media production devices) are identified in some embodiments. In this example, at step 402, a device discovery daemon of a media tracer device scans the local network, using DNS-SD queries to IS-04 device registries. At step 404, the media tracer device compiles an initial list of devices with the information from the device registries.

At step 406, the media tracer device accesses one or more additional resources to collect additional data about the media devices from the network switches. In one embodiment, media tracer device uses APIs to access the data in LLDP tables, ARP tables and FDB tables. Then, at step 408, the tracer device examines the data collected from these additional resources, determining the best resource upon which to rely for information about the positioning and connectivity of the media production devices. In one embodiment, the media tracer device uses an algorithm that favors LLDP data, then FDB data, then ARP data. For example, if all of these sources have different information for the positioning and connectivity of a media production device, the LLDP data may be taken as true despite disagreement with the FDB data and ARP data. As another example, there may be no LLDP data for the positioning and connectivity of the device, and the FDB data and ARP data may be in disagreement, in which case the FDB data may be used instead of the ARP data. If there is neither LLDP data nor FDB data, the ARP data may be used. At step 410, the media tracer device generates a finalized list of the media production devices.

Referring again to FIG. 3, at step 304, connections of the devices to the network are identified. This allows the positions of the various connected devices to be identified so that information about network traffic can be associated with each of the devices.

At step 306, network connection statistics which have been previously collected by devices in the network are gathered by the media tracer device. In particular, the information which is collected relates to the connections corresponding to the media production devices in the network. At step 308, the collected network connection statistics are correlated with the identified devices that are connected to the network.

For example, the NMOS APIs of the devices provide information such as the MAC address and other basic configuration information for the media devices, but this information doesn't indicate where in the network these devices are connected, and they don't provide information about the traffic at any point in the network. Sources such as the forwarding database, ARP and LLDP are accessed to determine where the devices are actually connected to the network. Then, various network information that is commonly collected, such as the amount of traffic at a particular interface or the identification of a particular interface as generating an error, are correlated to a particular media device which is connected to the network at that interface. Thus, the correlated information shows that a particular media device has a certain amount of traffic, or that the particular device is causing an error.

At step 310, the identified devices and correlated network statistics are presented in a user interface display. In alternative embodiments, the correlated device and network connection statistics may be provided to a consuming device or application rather than being presented to a user via user interface.

Figure 5:
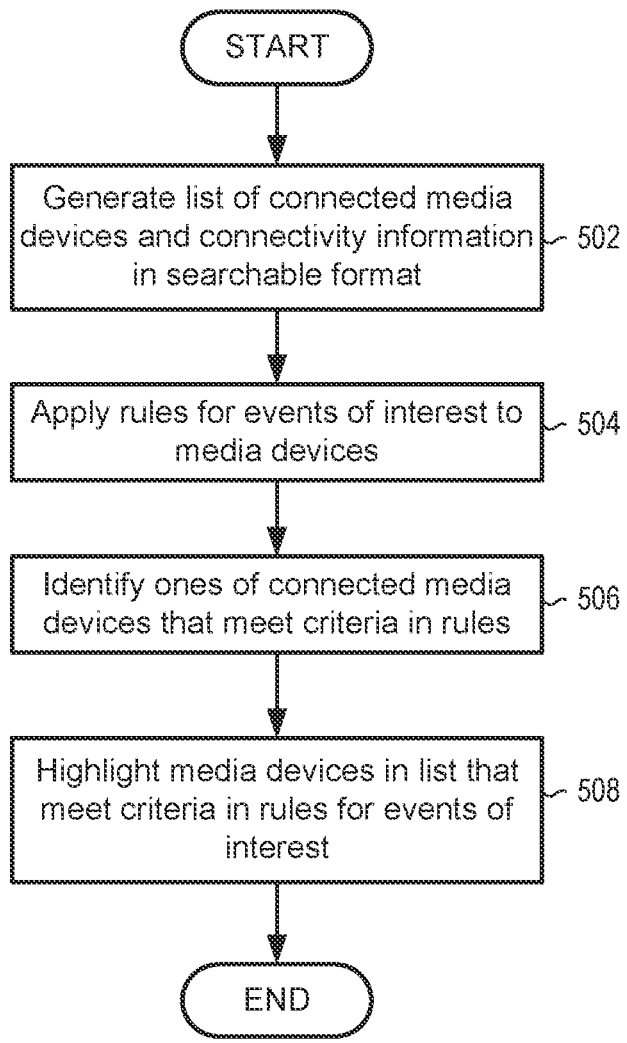
FIG. 5 is a flow diagram illustrating an example process by which the correlated media production device and network connectivity information is presented in accordance with some embodiments.

The portion of the method relating to the presentation of the identified devices and correlated network statistics is shown in more detail in FIG. 5, which is a flow diagram illustrating an example process by which the correlated media production device and network connectivity information is presented in a user interface in one embodiment. At step 502 in this example, all of the relevant data collected by the media tracer device is put into a searchable list. Searchable list formats can be built and modified as the user desires to filter entries based on events of interest. At step 504, a set of rules that define one or more events of interest are applied to the collected device and connectivity data. At step 506, the media tracer device determines whether criteria defined by the applied rules are met by one or more of the media production devices and/or the network connections associated with the devices. At step 508, if one of the media production devices meets particular criteria in the rules that define any of the events of interest, then the device is highlighted in the list.

More than one device may be identified as meeting the criteria for a given event of interest, and one or more events of interest can be indicated in the list. Embodiments may use any suitable indicator (e.g., highlighting, bolding, using a particular font color) to indicate that a device presents an event of interest. Examples of events of interest that may cause highlighting of a device may include, but are not limited to: devices appearing in a registry, but not in the network; interface ports operating near capacity; devices having irregular ingress and egress traffic; etc. It should be noted that after device connectivity has been determined, and information has been collected on the network devices statistics for the connections of the media devices, the statistics can be used to build additional diagnostic tools.

One embodiment comprises a method for providing a centralized view of media production devices connected to a network. This method includes identifying a set of media production devices connected to a network and compiling a list of the identified devices. Then, network position information is collected for the identified devices. For each of the identified devices, a corresponding connection to the network is identified using the collected network position information and corresponding network statistics are collected for each of the identified connections of the devices to the network. A list of the identified devices is then stored in a searchable format, where for each of the identified devices, the list includes at least a portion of the network statistics for the connection corresponding to the identified device.

In some embodiments, the set of media production devices are identified by performing DNS-SD scans of device registries in the network. The position information may include one or more of: Link Layer Discovery Protocol (LLDP) data, Address Resolution Protocol (ARP) data, and forwarding database (FDB) data. If the position information which is collected includes conflicting data, the method may prioritize LLDP data first, FDB data second, and ARP data third. The network statistics may be collected by querying network switches to obtain the network statistics using APIs to access the network switches.

In some embodiments, the method includes generating a user interface that displays the list of media production devices to a user. Additionally, the method may apply a set of rules to the list of the identified devices and the corresponding network statistics to identify corresponding predetermined conditions. In response to determining that one of the identified devices and the corresponding network statistics satisfy a first one of the set of rules, the corresponding one of the identified devices may be highlighted in the user interface. The set of rules may identify such predetermined conditions as: identified devices being in a device registry but not in the network; interface ports operating near their traffic capacity; and identified devices having irregular ingress or egress traffic.

An alternative embodiment comprises a media tracer device which is connected to a network and includes a hardware processor and a memory, the hardware processor configured to identify a set of media production devices connected to a network and compile a list of the identified devices. The hardware processor is further configured to collect network position information for the identified devices and identify, for each of the identified devices, a corresponding connection to the network using the collected network position information. The hardware processor further collects, for each of the identified connections to the network, corresponding network statistics. The hardware processor then stores a list of the identified devices in a searchable format, where for each of the identified devices, the list includes at least a portion of the network statistics for the connection corresponding to the identified device.

In some embodiments, the hardware processor is configured to identify the set of media production devices by performing DNS-SD scans of device registries in the network. The position information may include one or more of: LLDP data, ARP data, and FDB data. If the position information includes conflicting data, the hardware processor may be configured to prioritize LLDP data first, FDB data second, and ARP data third. The hardware processor may be configured to collect the network statistics by querying network switches to obtain the statistics.

In some embodiments, the hardware processor is further configured to generate a user interface that displays the list of media production devices to a user. The hardware processor may apply a set of rules to the list of the identified devices and the corresponding network statistics to identify corresponding predetermined conditions, where in response to determining that one of the identified devices and the corresponding network statistics satisfy a first one of the set of rules, the hardware processor highlights that device in the user interface. The hardware processor may apply a set of rules to the list of the identified devices and the corresponding network statistics to identify corresponding predetermined conditions, where the conditions comprise at least one of: one of the identified devices being in a device registry but is not in the network; an interface port operating near a corresponding traffic capacity; and one of the identified devices having irregular ingress or egress traffic.

Another alternative embodiment comprises a software program product comprising a non-transitory computer-readable medium storing instructions that are executable by one or more processors to perform a method substantially as described above.

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature or function, including any such embodiment feature or function described. While specific embodiments of, and examples for, the embodiments are described herein for illustrative purposes only, various equivalent modifications are possible within the spirit and scope of the disclosure, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments disclosed herein will be employed without a corresponding use of other features, and features described with respect to one embodiment may be combined with features of other embodiments without departing from the scope and spirit of the disclosure as set forth.

What is claimed is:

1. A method for providing a centralized view of media production devices connected to a network, the method comprising:
    identifying a set of media production devices connected to a network;
    compiling a list of the identified media production devices;
    collecting network position information for the identified media production devices;
    identifying, for each of the identified media production devices, a corresponding connection to the network using the collected network position information;
    collecting, for each of the identified connections to the network, corresponding network statistics; and
    storing a list of the identified media production devices in a searchable format, wherein for each of the identified media production devices the list includes at least a portion of the network statistics for the connection corresponding to the identified device.

2. The method of claim 1, wherein identifying the set of media production devices comprises performing DNS-SD scans of device registries in the network.

3. The method of claim 1, wherein the position information comprises Link Layer Discovery Protocol (LLDP) data, Address Resolution Protocol (ARP) data, and forwarding database (FDB) data.

4. The method of claim 3, further comprising, if the position information includes conflicting data, prioritizing LLDP data first, FDB data second, and ARP data third.

5. The method of claim 1, wherein collecting the network statistics comprises querying network switches to obtain the network statistics.

6. The method of claim 5, wherein querying the network switches comprises accessing the network switches via corresponding APIs.

7. The method of claim 1, further comprising generating a user interface that displays the list of media production devices to a user.

8. The method of claim 7, further comprising applying a set of rules to the list of the identified media production devices and the corresponding network statistics to identify corresponding predetermined conditions.

9. The method of claim 8, wherein in response to determining that one of the identified media production devices and the corresponding network statistics satisfy a first one of the set of rules, highlighting the one of the identified media production devices in the user interface.

10. The method of claim 8, wherein the first one of the set of rules identifies ones of the identified media production devices that are in a device registry but are not in the network.

11. The method of claim 8, wherein the first one of the set of rules identifies interface ports that are operating near their traffic capacity.

12. The method of claim 8, wherein the first one of the set of rules identifies ones of the identified media production devices that have irregular ingress or egress traffic.

13. A media tracer device comprising:
    a hardware processor and a memory, the hardware processor connected to a network and configured to perform the method comprising:
    identifying a set of media production devices connected to a network;
    compiling a list of the identified media production devices;
    collecting network position information for the identified media production devices;
    identifying, for each of the identified media production devices, a corresponding connection to the network using the collected network position information;
    collecting, for each of the identified connections to the network, corresponding network statistics; and
    storing a list of the identified media production devices in a searchable format, wherein for each of the identified media production devices, the list includes at least a portion of the network statistics for the connection corresponding to the identified device.

14. The media tracer device of claim 13, wherein the hardware processor is configured to identify the set of media production devices by performing DNS-SD scans of device registries in the network.

15. The media tracer device of claim 13, wherein the position information comprises Link Layer Discovery Protocol (LLDP) data, Address Resolution Protocol (ARP) data, and forwarding database (FDB) data.

16. The media tracer device of claim 15, wherein if the position information includes conflicting data, the hardware processor is configured to prioritize LLDP data first, FDB data second, and ARP data third.

17. The media tracer device of claim 13, wherein the hardware processor is configured to collect the network statistics by querying network switches to obtain the network statistics.

18. The media tracer device of claim 13, wherein the hardware processor is further configured to generate a user interface that displays the list of media production devices to a user.

19. The media tracer device of claim 18, wherein the hardware processor is further configured to apply a set of rules to the list of the identified media production devices and the corresponding network statistics to identify corresponding predetermined conditions, wherein in response to determining that one of the identified media production devices and the corresponding network statistics satisfy a first one of the set of rules, the hardware processor is configured to highlight the one of the identified media production devices in the user interface.

20. The media tracer device of claim 18, wherein the hardware processor is further configured to apply a set of rules to the list of the identified media production devices and the corresponding network statistics to identify corresponding predetermined conditions, and wherein the corresponding predetermined conditions comprise at least one of: one of the identified media production devices is in a device registry but is not in the network; an interface port is operating near a corresponding traffic capacity; and one of the identified media production devices has irregular ingress or egress traffic.

* * * * *